(12) United States Patent
Yadav-Ranjan

(10) Patent No.: US 8,385,897 B1
(45) Date of Patent: Feb. 26, 2013

(54) GLOBAL TEXT MESSAGING SYSTEM AND METHOD

(75) Inventor: Rani Yadav-Ranjan, San Jose, CA (US)

(73) Assignee: Navigator Technology, Inc., Fremont, CA (US)

(*) Notice: Subject to any disclaimer, the term of this patent is extended or adjusted under 35 U.S.C. 154(b) by 357 days.

(21) Appl. No.: 12/777,986

(22) Filed: May 11, 2010

Related U.S. Application Data

(60) Provisional application No. 61/176,988, filed on May 11, 2009.

(51) Int. Cl.
*H04M 3/42* (2006.01)
(52) U.S. Cl. .......... 455/414.4; 455/412.1; 455/466; 455/550.1; 709/206
(58) Field of Classification Search .... 455/412.1–414.4, 455/466, 418–420, 550.1
See application file for complete search history.

(56) References Cited

U.S. PATENT DOCUMENTS

| | | | |
|---|---|---|---|
| 6,600,930 B1* | 7/2003 | Sakurai et al. | 455/414.3 |
| 6,981,023 B1* | 12/2005 | Hamilton et al. | 709/206 |
| 7,493,381 B2* | 2/2009 | Garg | 709/223 |
| 7,640,011 B2* | 12/2009 | Lee | 455/418 |
| 7,650,170 B2* | 1/2010 | May et al. | 455/569.2 |
| 7,725,116 B2* | 5/2010 | Mumick et al. | 455/466 |
| 8,126,437 B1* | 2/2012 | Major et al. | 455/413 |
| 8,249,568 B2* | 8/2012 | Salmon | 455/414.4 |
| 2002/0188690 A1* | 12/2002 | Lee | 709/206 |
| 2003/0050984 A1* | 3/2003 | Pickup et al. | 709/206 |
| 2004/0116135 A1* | 6/2004 | Mikan et al. | 455/466 |
| 2006/0136561 A1* | 6/2006 | Lee | 709/206 |

* cited by examiner

*Primary Examiner* — Sharad Rampuria
(74) *Attorney, Agent, or Firm* — Maryam Imam; IPxLaw Group LLP

(57) ABSTRACT

A global messaging system and method are described in which the user is able to send and receive unlimited text messages to contacts.

8 Claims, 6 Drawing Sheets

GLOBAL TEXT MESSAGING SYSTEM AND METHOD

PRIORITY CLAIM/RELATED APPLICATIONS

This application claims the benefit under 35 USC 119(e) to and priority under 35 USC 120 to U.S. Provisional Patent Application Ser. No. 61/176,988 filed on May 11, 2009 and entitled "Global Text Messaging System and Method", the entirety of which is incorporated herein by reference.

FIELD

The disclosure relates generally to a system and method for providing text messaging.

BACKGROUND

Systems and services exist that allow a user to send a short message service (SMS) or text message (both known more generally as a text message) to another user. Typically, the text message can be initiated by a user with a computing device that has phone capabilities such as a cell phone, a converged device, etc. and the phone company/service provider charges the user a set fee for a predetermined number of text messages. Text messages are especially popular with teenagers and younger people. The problem is typically that, although the per message charge is relatively small, it can become very expensive if the user goes over the allotted text messages which occurs often with younger people/teenagers who text message frequently.

There are also services provided that allow the user, using a plug-in on a computer, to send and receive text messages. Typically, a fee is charged to send a predetermined number of text messages. The drawback of these systems, however, is that any reply text message goes back to the user's cellphone or computing device which is very inconvenient. Thus, it is desirable to provide global text messaging system and method that overcomes the issues with existing systems and method and it is to this end that the disclosure is directed.

DETAILED DESCRIPTION OF ONE OR MORE EMBODIMENTS

The disclosure is particularly applicable to a web-based global text messaging system and it is in this context that the disclosure will be described. It will be appreciated, however, that the global text messaging system has greater utility since it can be implemented in other manner for example using other computer architectures (stand alone computer, terminal, peer to peer, etc.) and the system can be used for other types of messages and messaging that are within the scope of the disclosure. An implementation of the global messaging system is the website, http://www.txtnavigator.com/, although the global messaging system is not limited to that implementation of the system. Now, a web-based implementation of the messaging system and method are described.

Figure 1:
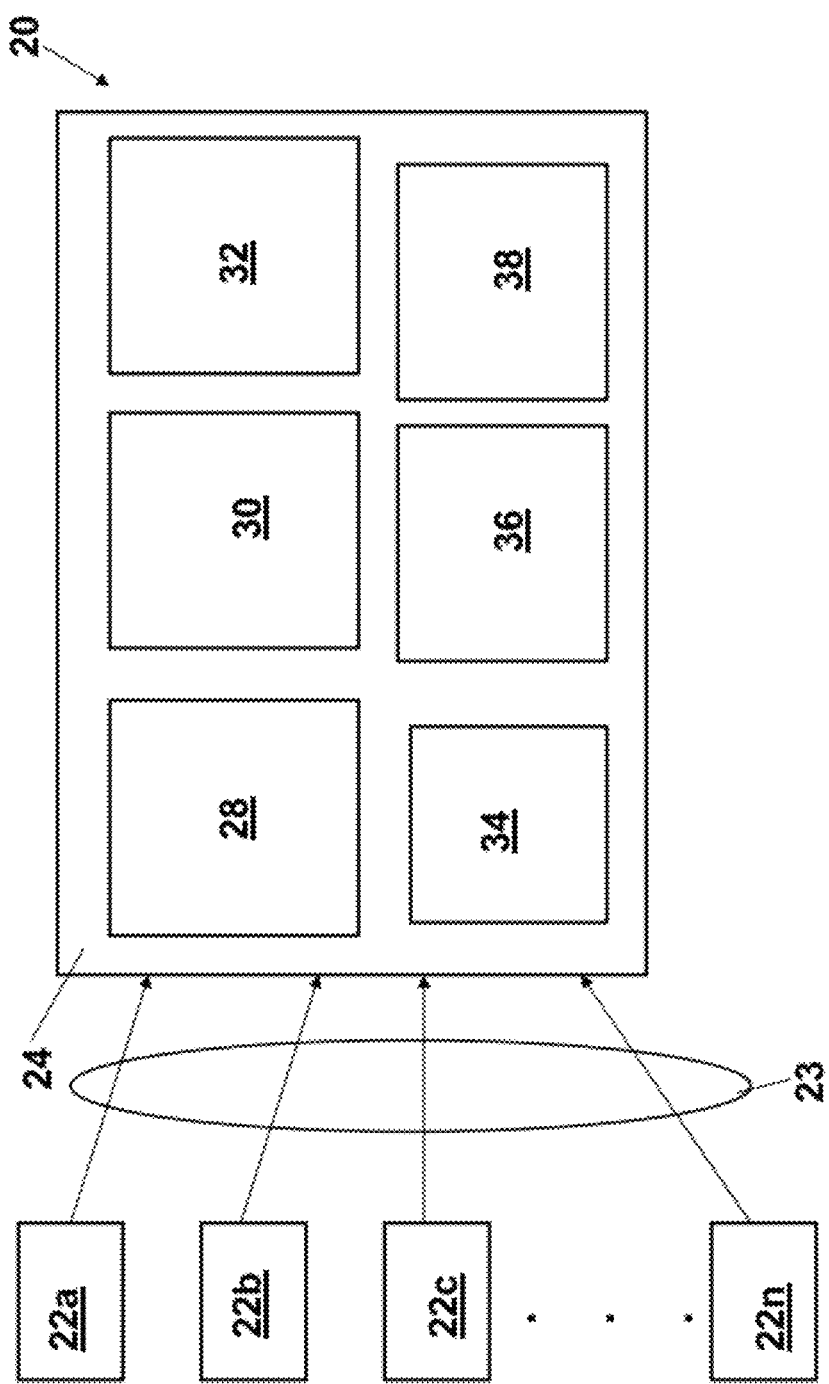
FIG. 1 is an illustration of a web-based implementation of a global text messaging system.

FIG. 1 is an illustration of a web-based implementation of a global text messaging system 20. The system 20 may include one or more computing devices 22 (such as 22a, 22b, . . . , 22n as shown in FIG. 1) that may be capable of connecting to a messaging unit 24 over a link 23 in order to, among other things, configure their user account, add contacts to their user account and send/receive messages, such as text messages, using the messaging unit. Each computing device 22 may be a processing unit based device with sufficient memory, processing power and connectivity to connect with and interchange information with the unit 24. For example, each computing device may be a personal computer (laptop or desktop), a mobile device, a wireless email device (such as the Blackberry products or an Apple iPhone), a cellular phone device, a terminal device and the like. The link 23 may be a wired or wireless link such as an Ethernet link, a LAN, WLAN, computer network, the Internet, a cellular network, a digital data wireless network and the like. In order to receive the web pages of the messaging unit 24 as described below, each computing device may execute an application on the processing unit of the computing device to receive and display the web pages, such as a browser application.

The messaging unit 24 may be implemented as one or more known server computers that execute a plurality of lines of computer code to implement the functions and operations of the messaging unit as described below, but may also be implemented in hardware, etc. The messaging unit 24 may further comprise a web server 28 (implemented using a plurality of lines of computer code in one embodiment as a software based web server) that establishes and maintains connections with the one or more computing devices 26 over the link 23 using various known protocols such as HTTP or SHTTP and serves web pages to the computing devices that request information from the user of the computing device or provide information to the user of the computing device. The messaging unit 24 may also use the link 23 to send out messages for the user and to receive messages for the user. The messaging unit 24 may further comprise a user account creator unit 30 (implemented using a plurality of lines of computer code in one embodiment) that guides the user through a user sign up process in which the user provides information to set up the account including a cellular phone number. The sign-up process to be able to send/receive messages, such as text messages, confirms the identity of the user and thus eliminates spam messages. The messaging unit 24 may further comprise a converter unit 32 (implemented using a plurality of lines of computer code in one embodiment) that converts a cell phone number of a user into an email address that allow the messaging unit to send and receive messages, such as text or SMS messages, for the user over any delivery medium. The messages, such as text or SMS messages, are then communicated to the user through the web pages that are delivered to the computing devices 22. For example, a cell phone number of 408-555-1212 on the Verizon carrier system is converted into 4085551212@vztext.com in which the carrier's source domain name is part of the delivery address. To send the text messages over the link 23, the messaging system may include a message communication unit 38 that may be implemented using an open source tool, such as phpmailer, to handle this process since phpmailer is a piece of code that adds email capability to web sites.

The messaging unit 24 may further comprise a user database 34 (implemented using a plurality of lines of computer code in one embodiment) that stores the various data/information associated with each user of the system including the cell phone number and the converted email address that is used for the messages. The messaging unit 24 may further comprise a message database 36 (implemented using a plurality of lines of computer code in one embodiment) that stores, for each user, the one or more messages, such as text messages or SMS messages) sent and/or received by each user of the system.

The messaging system provides global text messages. The converter unit 32 has the information on more than 200 mobile telephone providers so that it can create the appropriate email address. The messaging system then uses the Internet (or any other network) to send/receive text messages from anyone. In addition, unlike other text messaging systems, the messaging system, when a person responds to a text message (such as from a cell phone), the message is routed to the messaging system and appears in the user interface for the user generated by the messaging system (not on the cell phone of the user.) Since the messaging system is web-based, the user can use any computing device that has a browser (or similar application) to access the messaging system and compose/read messages on the system. In addition, the messaging system does not require software/code to be downloaded and installed on the computing device. The messaging system, because it is web-based, also is portable, international and not dependent on charges for text messages. In addition, when a contact is added into the system by a user, that new contact receives a notification to approve or deny the attempt to text message them so that the new contact is not surprised later due to text messaging charges.

Figure 2:
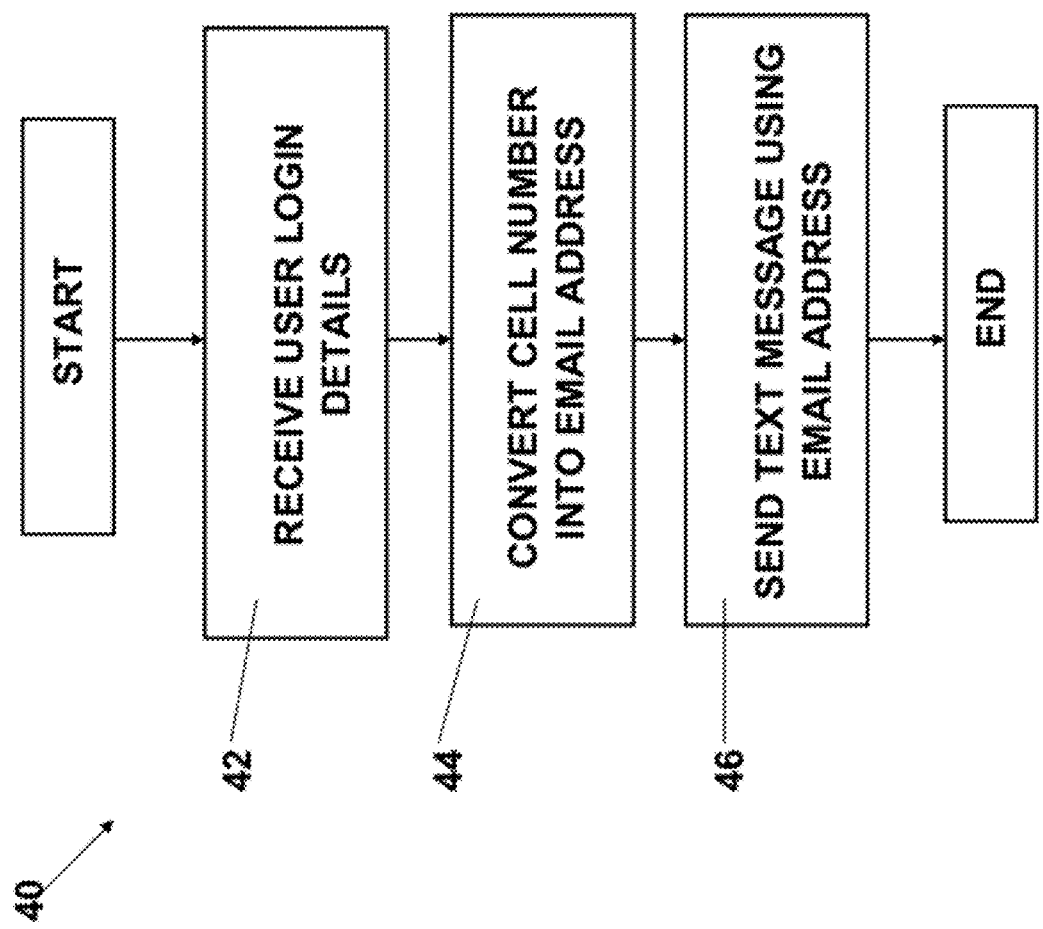
FIG. 2 illustrates a method for global text messaging.

FIG. 2 illustrates a method 40 for global text messaging that can be implemented by the system shown in FIG. 1. In the method, the system receives the user login details (42) including detail about the user including his/her cell phone number (such as 408-555-1212). The converter unit of the system shown in FIG. 1 then converts the cell phone number into an email address (44) such as 4085551212@vztext.com as described above. Once the cell number is converted into the email address, the user can send/receive text messages using the email address (46) so that the messaging system allows the user to send/receive text messages for free to a predetermined number of contacts as described below in more detail.

Figure 3:
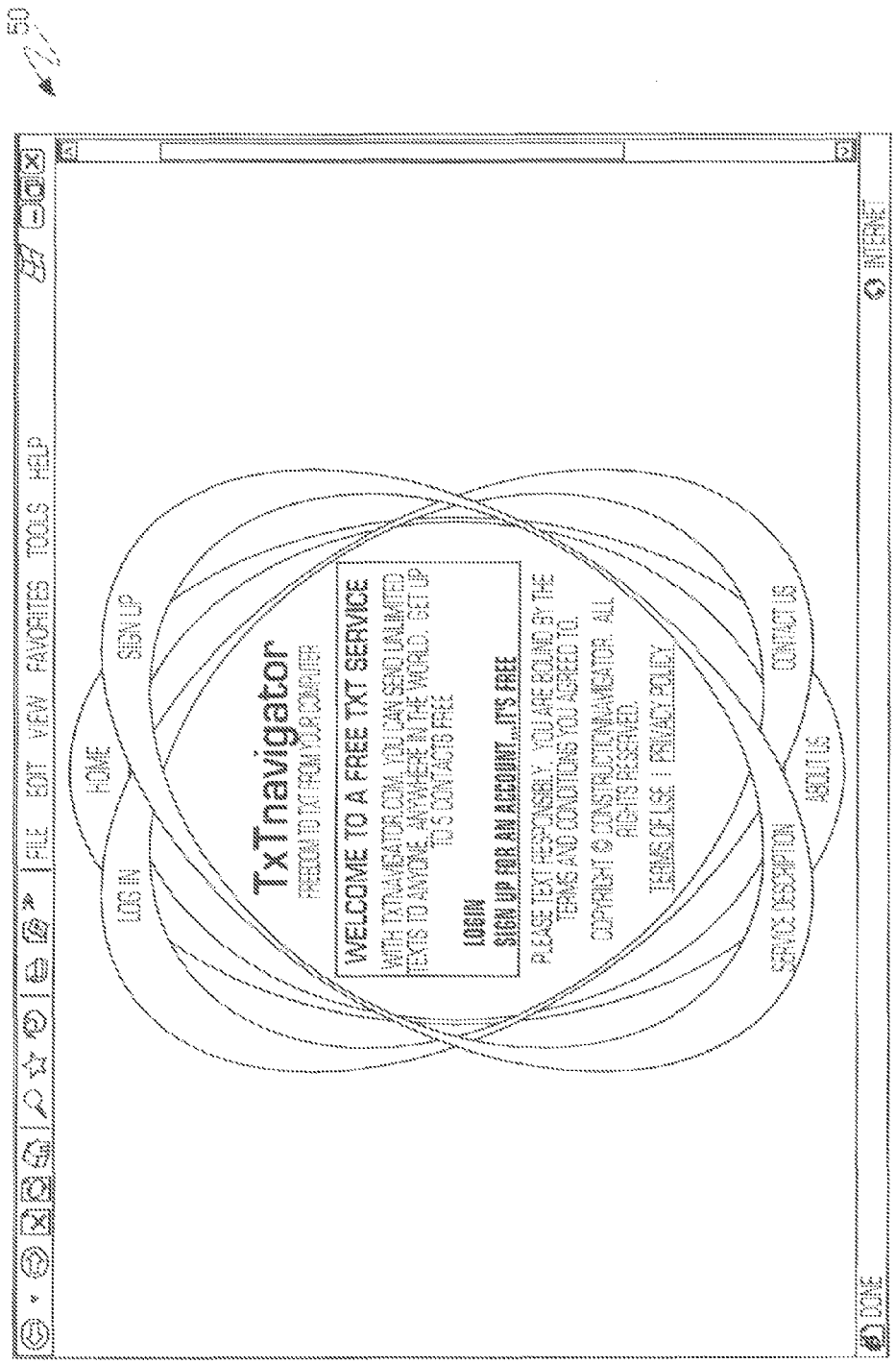
FIG. 3 illustrates an example of a user interface of a home page of the global text messaging system.
Figure 4:
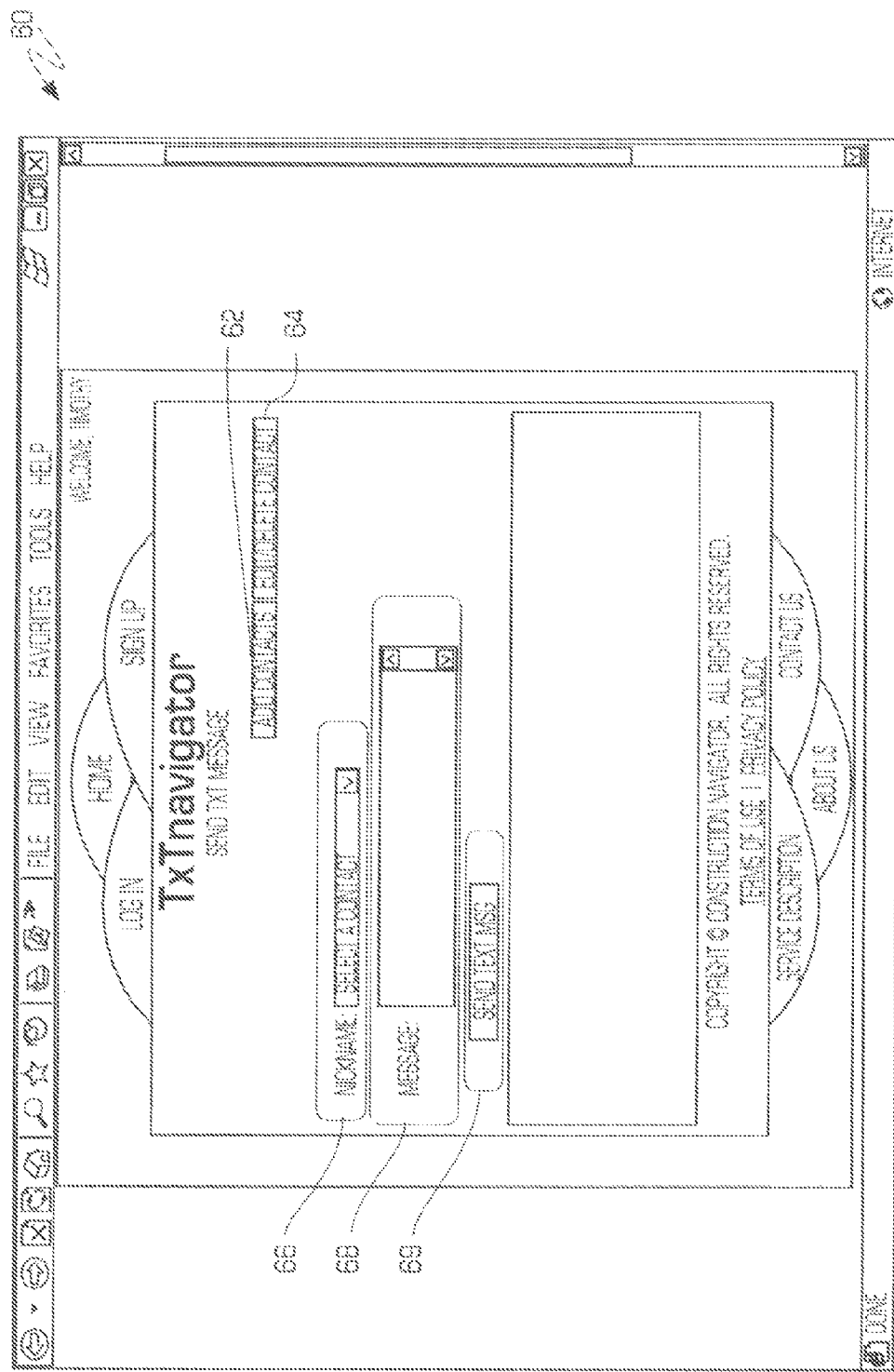
FIG. 4 illustrates an example of a user interface for creating and sending a new text message using the global text messaging system.

FIG. 3 illustrates an example of a user interface of a home page 50 of the global text messaging system that allows the person viewing the user interface to perform various actions. If the user is already registered and logs into the system, the user can compose a new text message using the user interface 60 shown in FIG. 4. The compose message user interface 60 may include an "Add Contact" button 62 (which is described below with reference to FIG. 5) that allows the user to add a new contact who can then receive the text messages as well as an "Edit/Delete Contact" button 64 that allows the user to modify or delete an existing contact. The user interface 60 shown in FIG. 4 may also include a "Nickname" portion 66 that allows the user to select the nickname of the contact to whom the new text message will be sent, a message portion 68 in which the user can type the new text message and a send button 69 that sends the composed text message to the selected contact.

Figure 5:
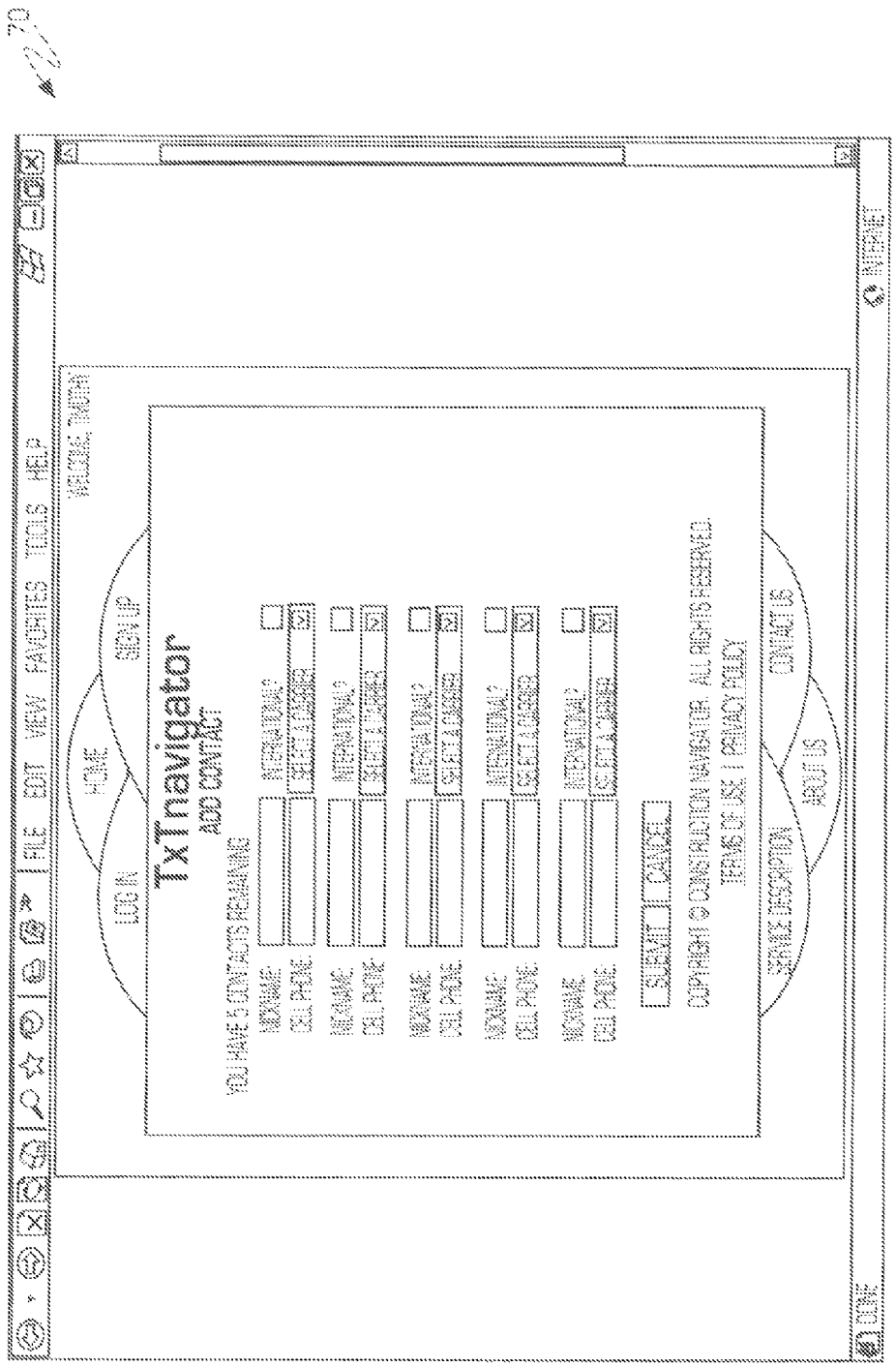
FIG. 5 an example of a user interface for adding new contacts in the global text messaging system.

FIG. 5 an example of a user interface 70 for adding new contacts in the global text messaging system in which the user of system enters the nickname, cell phone number and selects a carrier of the contact's cell phone so that the user can send text messages to the new contact. The free version of the messaging system allows a user to enter up to five contacts into the text messaging system.

Figure 6:
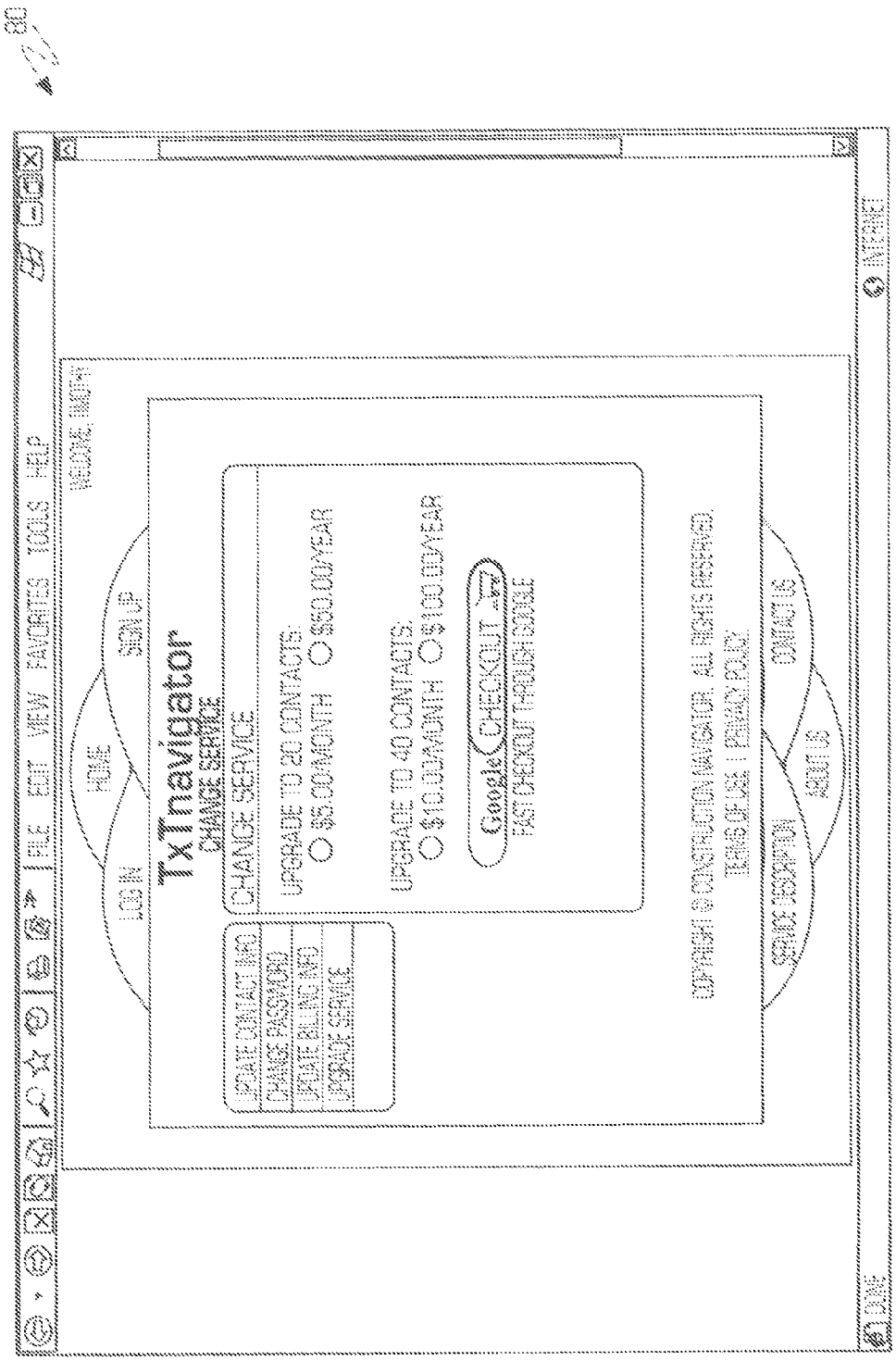
FIG. 6 an example of a user interface for managing an account of the global text messaging system.

FIG. 6 an example of a user interface 80 for managing an account of the global text messaging system in which the user can manage his/her account. The user interface also allows the user to upgrade to a premium service ($5.00 per month or $50 per year for up to 20 contacts $10.00 per month or $100 per year for up to 40 contacts), change their password, update contact information and/or update billing information.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A global messaging system comprising;
    a messaging unit;
    a plurality of computing devices wherein each computing device is capable of connecting to the messaging unit over a link;
    the messaging unit further comprises a converter unit that converts a cell phone number of a user into an text email address using a phpmailer to allow the messaging unit to send and receive text or SMS messages and
    a message communications unit that allows the user to send and receive text messages globally using the text email address.

2. The system of claim 1, wherein each computing device further comprises one of a personal computer, a mobile device, a wireless email device, a cellular phone device and a terminal device.

3. The system of claim 1, wherein the messaging unit further comprises one or more server computers.

4. The system of claim 1, wherein the messaging unit further comprises a web server that interacts with the plurality of computing devices and exchanges data with the plurality of computing devices.

5. The system of claim 1, wherein the messaging unit further comprises a user account creator unit.

6. A global messaging method comprising;
    providing a messaging unit;
    connecting one or more computing devices to the messaging unit over a link;
    converting, in the messaging unit, a cell phone number of a user into an text email address, with the use of a phpmailer, the messaging unit to send and receive text or SMS messages; and
    sending and receiving text messages globally using the text email address.

7. The method of claim 6, wherein the connecting one or more computing devices further comprises interacting, using a web server of the messaging unit with the one or more computing devices and exchanging data with the one or more computing devices.

8. The method of claim 6 further comprising creating, using a user account creator unit of.

* * * * *